United States Patent [19]

Tomita et al.

[11] Patent Number: 4,492,995
[45] Date of Patent: Jan. 8, 1985

[54] TAPE CASSETTE LOADING AND EJECTION DEVICE

[75] Inventors: Seiji Tomita, Yokosuka; Hideo Yokoyama, Yokohama, both of Japan

[73] Assignee: Tokyo Shibaura Denki Kabushiki Kaisha, Japan

[21] Appl. No.: 601,120

[22] Filed: Apr. 18, 1984

Related U.S. Application Data

[63] Continuation of Ser. No. 322,911, Nov. 19, 1981, abandoned, which is a continuation-in-part of Ser. No. 162,446, Jun. 24, 1980, Pat. No. 4,360,174.

[30] Foreign Application Priority Data

Jun. 29, 1979 [JP] Japan .................. 54-89362

[51] Int. Cl.³ .......................................... G11B 15/66
[52] U.S. Cl. .................................. 360/96.5; 360/96.6
[58] Field of Search ............... 242/200, 204, 197–199, 242/55, 19 A; 360/96, 130, 132, 96.5, 96.6, 130.2, 130.21

[56] References Cited

U.S. PATENT DOCUMENTS

| | | | |
|---|---|---|---|
| 3,285,610 | 11/1966 | Shields | 360/96.5 |
| 4,048,661 | 9/1977 | Staar | 360/130.24 |
| 4,050,087 | 9/1977 | Kishi | 360/96.6 |
| 4,109,286 | 8/1978 | Katsureyama et al. | 242/198 |
| 4,234,140 | 11/1980 | Van Nie et al. | 242/199 |
| 4,342,058 | 7/1982 | Osanai | 360/96.5 |
| 4,361,859 | 11/1982 | Schatteman | 360/96.5 |
| 4,768,814 | 10/1973 | Sato | 242/198 X |

OTHER PUBLICATIONS

IBM/TDB, vol. 16, No. 4, Sep. 1973, pp. 1331–1332, "Cassette Loading and Unloading Apparatus".

Primary Examiner—Bernard Konick
Assistant Examiner—Steven R. Garland
Attorney, Agent, or Firm—Cushman, Darby & Cushman

[57] ABSTRACT

A tape cassette loading device comprises a chassis on which a tape cassette is mounted, a pair of guide pins protruding from the chassis and capable of being fitted in guide holes of the tape cassette in a loaded position, a taper surface formed around the guide pin at a given height above the chassis so as to be tapered toward the extended end portion of the guide pin, and an ejection mechanism facing the front portion of the bottom surface of the tape cassette in the loaded position and capable of advancing and retreating along the guide pin. In the final ejected position the cassette rests on the upper tapered portion of the guide or guides.

7 Claims, 7 Drawing Figures

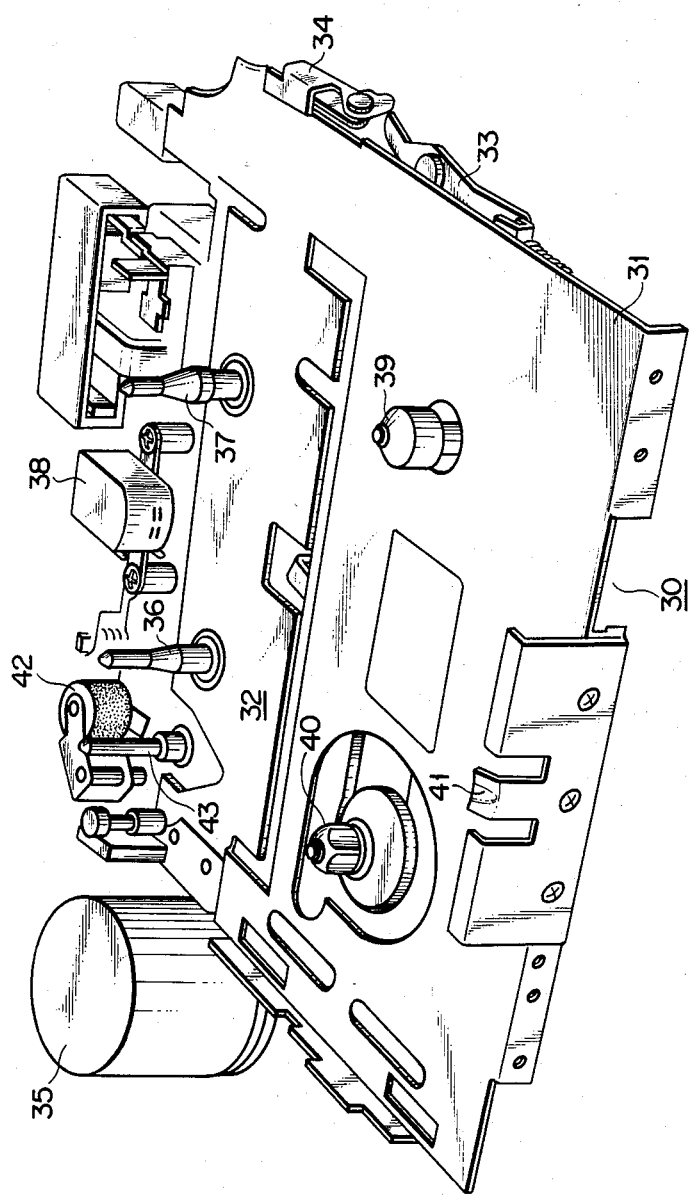

TAPE CASSETTE LOADING AND EJECTION DEVICE

CROSS REFERENCE TO RELATED APPLICATION

This application is a continuation of Ser. No. 06/322,911 filed on Nov. 19, 1981, now abandoned, which is a continuation-in-part of Ser. No. 06/162,446 filed on June 24, 1980, now U.S. Pat. No. 4,360,174.

BACKGROUND OF THE INVENTION

This invention relates to a tape cassette loading device of a cassette tape recorder with an ejection mechanism.

In general, a tape cassette is held in an operating position by means of guide pins fitted in a pair of guide holes formed in the cassette. In ejecting operations, the bottom surface of the tape cassette is pressed by an ejection mechanism so that the front end portion of the tape cassette is rocked to an ejection position, and then the tape cassette in such position is manually removed from the loading device. In order to hold the tape cassette in the ejection position in such prior art loading device, it is necessary to keep ones finger upon the ejection mechanism in a raised position, which is a good deal of trouble. The troublesomeness of such operation is increased expressly in the case of a compact cassette tape recorder which uses operation members of small size.

SUMMARY OF THE INVENTION

Accordingly, the object of this invention is to provide a tape cassette loading device of simple construction capable of holding a tape cassette in an ejection position without continued operation of an ejection mechanism for ejection, thereby facilitating ejecting operation.

BRIEF DESCRIPTION OF THE DRAWINGS

FIG. 2 is a perspective view of a loading device according to an embodiment of this invention;

FIGS. 4 and 5 are perspective views of a tape cassette and an ejection mechanism for illustrating cassette ejecting operation, in which FIG. 4 shows an operating state of the ejection mechanism, and FIG. 5 shows a state after the ejecting operation.

DETAILED DESCRIPTION OF THE PREFERRED EMBODIMENT

An embodiment of a loading device of a cassette tape recorder suitable as a compact (thin) cassette tape recorder will be described with reference to the accompanying drawings.

Figure 1A:
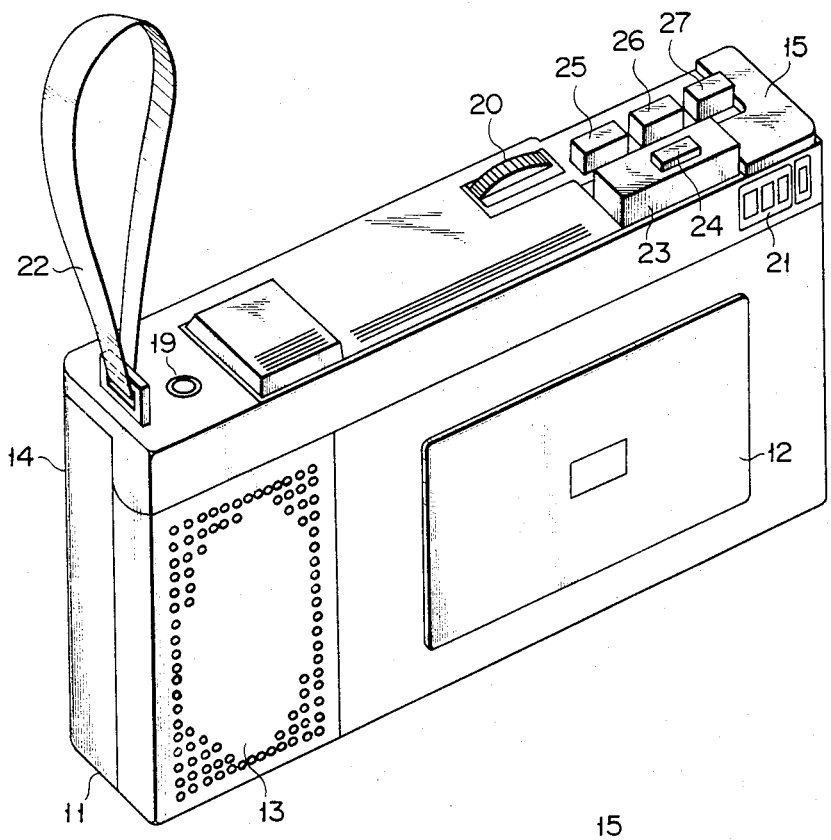
FIGS. 1A and 1B are a perspective view and a side view, respectively, showing the external appearance of a compact cassette tape recorder.
Figure 1B:
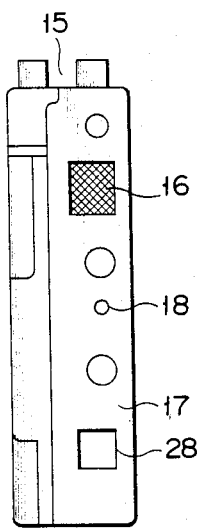

FIGS. 1A and 1B are an external perspective view and a side view, respectively, illustrating a tape recorder mounted in a cabinet 11. Numeral 12 denotes a cassette mounting portion formed at one side of the front of the tape recorder; 13, a speaker encasing part at the other side of the front; 14, a battery encasing part disposed at the back of 13; 15, a main operation part formed at one side of the top of the tape recorder; 16, a built-in microphone encasing part formed at the right side of the tape recorder; 17, a sub-operation part at the same side; 18, a jack part on the same side for outside connections; 19, a jack part formed at the other side of the top for connecting to an external power source; 20, a volume control part formed in the vicinity of the main operation part 15; 21, a tape counter display disposed in the top right corner of the front side; and 22, a band strap formed on the other side of the top near the power jack for carrying the tape recorder.

The main operation part 15 comprises a reproducing operation member 23, a recording operation member 24 housed internally at one side of the reproducing operation member 23, a stop operation and ejecting operation member 25 formed in stepped form in relation to the reproducing operation member 23 and the recording operation member 24, a fast forwarding operation member 26 and a rewinding operation member 27. The sub-operation part 17 comprises a pause operation member 28 only.

The tape recorder mechanism 30 shown in FIG. 2 comprises a series of a tape driving mechanism 32, an ejection selection lever 33, an ejection lever 34 and their associated members each formed in association with the operation members 23 to 27 and 28 on the top and bottom surfaces of a main chassis 31 which is formed from a relatively thin metal plate by a press treatment or the like. The tape driving mechanism 32 denotes all the members associated with the constant drive system as well as the fast forward and rewind high speed driving system, and is capable of a cueing or reviewing function. Numeral 35 denotes a motor; 36 and 37, cassette guide pins; 38, a magnetic recording and reproducing head; 39, a supply reel base; 40, a take-up reel base; 41, a cassette holder spring; 42, a pinch roller; and 43, a capstan.

The cassette holder spring 41 serves to hold as well as to press the cassette tape since a cassette tape press spring part is integrally formed with this spring and has a central part formed in the shape of a tongue which is more flexible than its ends.

Figure 3:
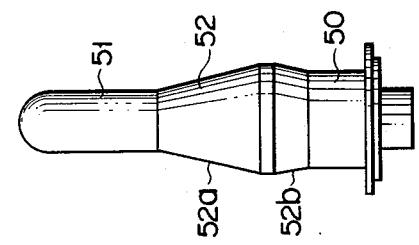
FIG. 3 is a side view of a guide pin used in the device of FIG. 2.

As shown in FIG. 3, the guide pins 36 and 37 are each formed of a base portion 50, a tip portion 51, and an intermediate portion 52 between these portions. The tip portion 51 is formed thinner than the base portion 50, and is rounded at the tip. Formed around the intermediate portion 52 are an upper taper surface 52a tapered toward the tip portion 51 and a lower taper surface 52b tapered toward the base portion 50.

Figure 4:
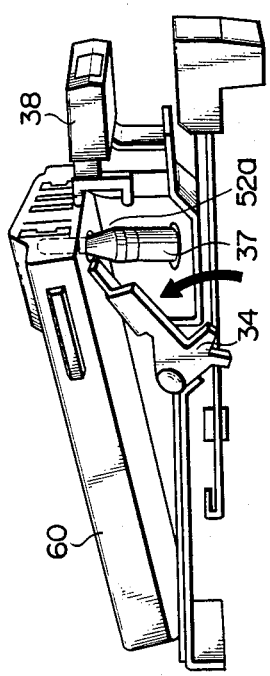
Figure 5:
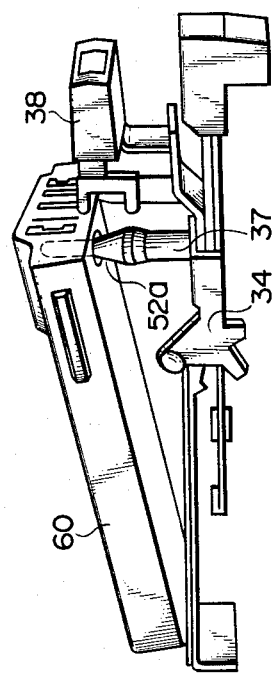

In the tape recorder with the guide pins of the aforementioned shape, a tape cassette 60 is opposed to the magnetic head 38 and held in an operable position with the base portions 50 of the guide pins 36 and 37 fitted in their corresponding guide pin insertion holes or guide holes. In this state, the ejecting operation member 25 is manually depressed to rock the ejection lever 34 in the direction of the arrow of FIG. 4. As a result, the free end of the lever 34 presses on the front portion of the bottom surface of the tape cassette 60 on one side thereof. Then, the front portion of the tape cassette 60 is lifted with its guide pin insertion holes guided by the guide pins 36 and 37 to be brought into an ejection position as shown in FIG. 4. When the ejecting operation member 25 is released in this state, it is returned to its original position by an urging means (not shown), thereby restoring the ejection lever 34 to its original position, as shown in FIG. 5. At this time, although the front portion of the tape cassette 60 is urged to go down to it original position by its own weight, the bottom edges of the guide pin insertion holes abut against the upper taper surfaces 52a of their corresponding guide pins to prevent the descent of the front portion. Thus, the tape cassette 60 is kept in the ejection position to be ready for removal. If the front portion of the top surface of the tape cassette 60 in the ejection position is pressed down, then the bottom edges of the guide pin insertion holes will slide along the upper taper surfaces 52a to cause the tape cassette 60 to rock and return to the operable position.

In the tape cassette loading device using the guide pins of the above-mentioned construction, the tape cassette 60 can be held in the inclined position or ejection position with its lower front edge portion engaged with the taper surfaces of the guide pins 36 and 37. Accordingly, the ejecting operation member 25 need not continue to be depressed at ejection, ensuring improved operating efficiency.

Figure 6:
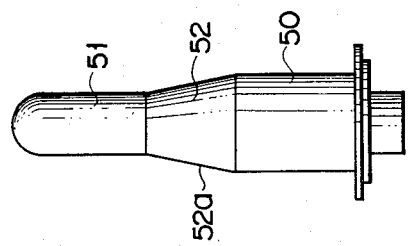
FIG. 6 is a side view showing a modification of the guide pin.

In the above embodiment, the lower taper surface is formed at the intermediate portion 52 of each guide pin. Instead of forming the lower taper surface, however, the upper taper surface 52a may be formed all over the intermediate portion 52, as shown in FIG. 6.

In the above embodiment, moreover, the taper surface 52a is formed on each of the guide pins. However, it is necessary only that the taper surface be formed on one of the guide pins. In this case, it is advisable to form the taper surface on the guide pin 37 nearer to the ejection lever 34 for smooth ejecting operation.

What we claim is:

1. A tape cassette loading device for selectively holding, in an operating position or an ejection position, a tape cassette of the type including forward and rearward portions and having at least one guide hole which includes a bottom edge defined in said forward portion, said tape cassette loading device comprising:

chassis means defining one surface on which the tape cassette is mounted when in said operating position;

guide pin means protruding from said one surface of said chassis means and engageable with said at least one guide hole to guide the tape cassette throughout the entire movement thereof between said operating and ejection positions; and ejection means operatively associated with said chassis and moveable along said guide pin between an upper position and a lower position to responsively displace the tape cassette between said operating position and said ejection position, respectively, said ejection means operating to raise said forward portion of the tape cassette so as to angularly dispose the tape cassette when in said ejection position relative to said one surface; and wherein said guide pin means includes downwardly and outwardly tapered surface defined at a predetermined height above said surface, said tapered surface establishing means for retaining said bottom edge of said guide hole in bearing contact against said tapered surface to responsively retain the tape cassette in said angularly disposed ejection position while yet permitting the tape cassette to be manually moved to said operating position upon application of pressing force to the tape cassette to cause said bottom edge to slide along said tapered surface.

2. A tape cassette loading device according to claim 6 further comprising second guide pin means located farther from said ejection mechanism than said first mentioned guide pin means to guide the tape cassette during movement thereof between said operating and ejection positions.

3. A tape cassette loading device according to claim 2 wherein said tapered surface is also defined on said second guide pin means.

4. A tape cassette loading device according to claim 2 wherein each of said guide pin means with said tapering surface includes a thick base portion, a thin tip portion, and an intermediate portion located between said base and tip portions and having said tapering surface defined thereon.

5. A tape cassette loading device according to claim 4 wherein said ejection means includes lever means for urging said forward portion of the tape cassette during movement thereof from said operating position to said ejection position in a direction to cross the respective axes of said first mentioned and said second guide means.

6. A tape cassette loading device according to claim 1 wherein said guide pin means with said tapered surface includes a thick base portion, a thin tip portion, and an intermediate portion located between said base and tip portions and having said tapered surface defined thereupon.

7. A tape cassette loading device according to claim 1 wherein said ejection means includes lever means for urging said forward portion of the tape cassette during movement thereof from said operating position to said ejection position in a direction to cross the axis of said guide pin means.

* * * * *